United States Patent
Sorenson (12)

(10) Patent No.: US 10,651,681 B2
(45) Date of Patent: May 12, 2020

(54) ELECTRONIC STATUS REPORTING CIRCUIT BREAKER

(71) Applicant: Carling Technologies, Inc., Plainville, CT (US)

(72) Inventor: Richard W. Sorenson, Ft. Lauderdale, FL (US)

(73) Assignee: Carling Technologies, Inc., Plainville, CT (US)

( * ) Notice: Subject to any disclaimer, the term of this patent is extended or adjusted under 35 U.S.C. 154(b) by 0 days.

(21) Appl. No.: 15/677,639

(22) Filed: Aug. 15, 2017

(65) Prior Publication Data

US 2019/0058354 A1    Feb. 21, 2019

(51) Int. Cl.

| | |
|---|---|
| *H01H 73/00* | (2006.01) |
| *H02J 13/00* | (2006.01) |
| *H02H 3/04* | (2006.01) |
| *H02H 3/00* | (2006.01) |
| *H02H 3/10* | (2006.01) |
| *G05B 9/02* | (2006.01) |
| *H01H 83/04* | (2006.01) |
| *H01H 71/04* | (2006.01) |

(Continued)

(52) U.S. Cl.
CPC .......... *H02J 13/0017* (2013.01); *G05B 9/02* (2013.01); *H01H 71/04* (2013.01); *H01H 83/04* (2013.01); *H02H 3/006* (2013.01); *H02H 3/04* (2013.01); *H02H 3/10* (2013.01); *H02H 3/066* (2013.01); *H02H 11/005* (2013.01)

(58) Field of Classification Search
CPC .................................................. H02J 13/0017
USPC ........................................................... 361/115
See application file for complete search history.

(56) References Cited

U.S. PATENT DOCUMENTS

| | | | |
|---|---|---|---|
| 7,030,769 B2 * | 4/2006 | Miller .................... | H01H 71/04 340/635 |
| 7,911,746 B2 * | 3/2011 | Zaretsky ................ | H02H 3/335 327/439 |
| 2002/0101695 A1 | 8/2002 | Saksa | |

(Continued)

FOREIGN PATENT DOCUMENTS

| | | |
|---|---|---|
| CN | 103457259 A | 12/2013 |
| EP | 1744428 A2 | 1/2007 |

(Continued)

*Primary Examiner* — Thienvu V Tran
*Assistant Examiner* — Lucy M Thomas
(74) *Attorney, Agent, or Firm* — Forge IP, PLLC (57) ABSTRACT

A circuit breaker includes a control circuit capable of generating and transmitting a test pulse through its attached circuit and any connected load while its contacts are open, with the breaker in the OFF, or TRIPPED, state, to determine if detrimental anomalies exist, such as a short circuit. In certain configurations, the control circuit can measure and store a circuit's parameters for a properly operating load when the breaker is in the OFF state, and subsequently with the breaker in the OFF, or TRIPPED, state, compare the stored parameters to determine if an alarm condition exists and thereby initiate appropriate alerts and actions. In an alternate configuration, the breaker can be commanded to the OFF position by the load sending a signal through the power connection, with the breaker then being able to store the load's reason for shut-down and report such information to a remote location.

29 Claims, 3 Drawing Sheets

(51) Int. Cl.
  *H02H 3/06*  (2006.01)
  *H02H 11/00*  (2006.01)

(56) References Cited

U.S. PATENT DOCUMENTS

| | | | |
|---|---|---|---|
| 2007/0008076 A1* | 1/2007 | Rodgers | H02J 3/14 700/295 |
| 2007/0195470 A1* | 8/2007 | Zhang | H02H 3/335 361/42 |
| 2008/0266728 A1* | 10/2008 | Santos | H02H 7/0822 361/24 |
| 2009/0206059 A1* | 8/2009 | Kiko | H02J 3/14 218/143 |
| 2011/0085273 A1* | 4/2011 | Bengtsson | H02H 3/06 361/65 |
| 2011/0216452 A1* | 9/2011 | Haines | H02H 3/00 361/42 |
| 2011/0251807 A1 | 10/2011 | Rada et al. | |

FOREIGN PATENT DOCUMENTS

| | | |
|---|---|---|
| EP | 01744428 A2 | 1/2007 |
| JP | 2009-163882 A | 7/2009 |
| WO | WO2016160383 A1 | 10/2016 |

\* cited by examiner

ELECTRONIC STATUS REPORTING CIRCUIT BREAKER

FIELD OF THE INVENTION

The invention relates to a circuit interrupter that is able to provide information when in an off or tripped state, and more specifically, the invention relates to a circuit breaker that monitors the status of a connected circuit and load when the circuit breaker is not providing electrical power to the load.

BACKGROUND OF THE INVENTION

Circuit interrupters are electrical components that can be used to break (or open) an electrical circuit, interrupting the current flow. A basic example of a circuit interrupter is a switch, which generally consists of two electrical contacts in one of two states; either closed, meaning that the contacts are touching and electricity can flow between them, or open, meaning that the contacts are separated, and no electricity can flow between them.

Another example of a circuit interrupter is a circuit breaker. A circuit breaker may be used, for example, in an electrical panel to limit the electrical current being sent through connected electrical wiring. A circuit breaker is designed to protect electrical wiring and associated electrical components from damage caused by an overcurrent condition such as, a short circuit or a ground fault (collectively referred to as a fault condition). If such a fault condition occurs in the electrical circuit, the breaker will trip. This will cause a breaker that was in the "on" position to flip to the "off" position and interrupt the flow of electrical energy through the circuit breaker. When a circuit breaker is tripped, it may prevent a fire from starting on an overloaded circuit; it can also prevent damage to or the destruction of any devices that are drawing electricity from electrical circuit.

A standard circuit breaker has a terminal connected to a power supply, which may comprise electrical power provided by a power company. A standard circuit breaker also typically includes another terminal to which is connected to the electrical circuit that the circuit breaker is intended to protect. Conventionally, these terminals are referred to as the "line" and "load" terminals respectively. The line is often referred to as the input into the circuit breaker; whereas the load is often referred to as the output. The output supplies electrical energy to the electrical components connected to the electrical circuit.

A circuit breaker may be used to protect an individual device, or a number of devices. For example, an individual protected device, such as a condenser unit, may be directly connected to a circuit breaker. A circuit breaker may also be used to protect multiple devices by connecting to multiple components through wiring that terminates at electrical outlets. In this manner, the circuit breaker feeds electrical power to all the devices connected to the circuit via the outlets (e.g., a lamp, a television, a computer, a plug in air conditioner, etc.). In other configurations, circuit breakers may be for special use, for example, they may be provided in a rack in a server room where a specific number of servers are connected to a particular circuit breaker.

A circuit breaker can be used as a replacement for a fuse. Unlike a fuse however, which operates once and then must be replaced, a circuit breaker can be reset (either manually or automatically) to resume normal operation. Circuit breakers are generally considered safer to use than fuses. For example, in a situation where a fuse blows, interrupting power to a section of a building for example, it may not be apparent which fuse controls the interrupted circuit. In this case, all of the fuses in the electrical panel would need to be inspected to determine which fuse appears burned or spent. This fuse would then need to be removed from the fuse box, and a new fuse would need to be installed.

In this respect, circuit breakers can be much simpler to use than fuses. In a situation where a circuit breaker trips, interrupting power to a section of a building, for example, it may be easily apparent which circuit breaker controls the interrupted circuit by looking at the electrical panel and noting which breaker has switched off to the tripped position. Conventional circuit breakers include a switch on the face of the breaker where the switch is moved toward the center of the electrical panel for "on", toward the perimeter of the electrical panel for "off" and will reside in a center position for a "fault." This breaker can then be visually identified and reset. If the circuit breaker is in a fault state, the handle needs to be moved to the "off" state and then to the "on" state and power will be supplied to the connected electrical circuit.

In the circumstance in which a circuit breaker has tripped due to a fault, it is relatively easy to determine which breaker is tripped by a visual inspection. However, there is no information available as to what caused the overcurrent that caused the circuit breaker to trip, or whether or not the circumstance that led to the overcurrent still exists. The only way to determine this is to reset the breaker by turning it off, and then on. If the breaker immediately trips, the fault condition is still present. However, applying voltage to the circuit to test to see if a fault condition is still present is not an optimal solution.

Additionally, in the event of a tripped circuit breaker, a technician will in all likelihood, have to physically inspect the circuit and connected loads. In the event that the circuit feeds multiple outlets, the technician will typically unplug all the connected devices and reset the circuit breaker. If the circuit breaker trips, this tells the technician that a problem is likely with the wiring itself. If the circuit breaker does not trip, then the problem is likely with one of the connected loads. The technician can then iteratively connect and disconnect the loads to determine if one of the loads is causing the fault. Again, applying a high voltage for testing purposes is not ideal. Alternatively, if each of the loads is attached sequentially and the circuit breaker does not trip, then it could be that the total load on the circuit breaker exceeds the current rating of the circuit breaker and the loads would have to be connected elsewhere. However, this is a time consuming process, requires a technician to be on site to perform the testing and uses line voltage for testing purposes.

In the event that the circuit breaker feeds a hard wired connected load, such as a roof top condenser unit, the technician can disconnect the load and work through an iterative process to determine where a fault might exist in the circuit. Again, this approach uses line voltage as a test voltage and depends on the circuit breaker to trip in the event of a fault condition.

Another problem with the above approach is that no information beyond the fact that there is a fault that is causing the circuit breaker to trip, is obtained from the above-described method.

Still another problem is that, using a circuit breaker as a power switch or a diagnostic tool subjects the breaker to a greater number of operational cycles than it would otherwise experience in a typical circuit protection application. This can result in an unacceptably premature failure of the circuit breaker. Typical circuit breaker mechanisms are designed to survive only 20,000-30,000 cycles before failure. In order to increase the number of cycles that such circuit breakers can endure before failure, all of the components of the circuit breaker must be designed in a more robust way than would otherwise be required. This increases the cost of producing the circuit breaker.

Still another problem faced by loads that are connected to circuit breakers is that, circuit breakers are designed to trip once a current rating is exceeded. In other words, the circuit breaker is sized to protect the wiring that feeds electrical current to the load(s) connected to the circuit. This means that a connected load may begin to draw more current than it is designed to because of, for example, a problem with the load, but if the current draw does not exceed the current rating for the circuit breaker, electrical power will continue to be provided to the load (i.e., the circuit breaker is protecting the wiring from overheating, not the load connected to the wiring). As can then happen, eventually the load becomes more and more damaged until finally catastrophic failure of the load occurs, which then does cause an over current condition thereby causing the circuit breaker to trip. However, the damage is done and the connected load is irretrievably damaged.

It is therefore desired to provide an alternative system that is usable with a circuit interrupter that overcomes the aforementioned limitations.

SUMMARY OF THE INVENTION

Accordingly, what is desired is a circuit interrupter that provides information relating to the status of the circuit and connected load when the circuit interrupter is in either the off or tripped position.

It is also desired to provide a circuit breaker that provides data to a remote location identifying whether a fault on a circuit breaker in either the off or tripped position has been cleared.

It is further desired to provide a circuit breaker that provides data relating to the status of the circuit and connected load when the circuit interrupter is in either the off or tripped position without the need of providing any additional wiring to the connected load.

It is still further desired to provide a circuit breaker that can query a circuit and connected load in a safe manner when the circuit interrupter is in either the off or tripped position and without the need of providing any additional wiring to the connected load.

It is further desired to provide a circuit breaker that can receive a signal from a load to turn a circuit breaker off even if the threshold current limit of the circuit breaker has not been reached.

These and other objects are achieved in one configuration by the provision of a circuit interrupter that includes a control circuit placed within the housing of the circuit interrupter and including a storage having data stored relating to electrical values for various signal characteristics. The control circuit is configured such that if the circuit interrupter is in either the off or tripped state (e.g., the contacts are open), the control circuit generates and transmits a test signal having a low current and low voltage onto the output of the circuit interrupter (the load terminal). The control circuit then measures the electrical values of the test signal and compares the measured signal to the saved information to determine if the measured signal exceeds a threshold deviation from the saved information. If so, then the circuit interrupter determines that the fault condition remains and can transmit this information via a network connection to a remote location. Additionally, the data relating to the measured signal can also be sent such that, rather than simply providing binary data (e.g., circuit shorted/circuit not shorted), the transmitted information can provide some intelligence as to the actual state of the circuit and connected load.

The circuit interrupter is therefore provided as an electronic circuit breaker that embodies electronic control circuitry that may be positioned on, for example, a Printed Circuit Board (PCB) that will remain active while the breaker is in either off or tripped state. In one configuration, the electronic circuit breaker will perform and report data obtained by a periodic signal level testing of the circuit. This circuitry, in turn, may be capable of communicating to a remote monitoring device.

In one example, when the electronic circuit breaker is in the off, or tripped, position the electronics would continue to operate to check and report breaker operating condition. If, for example, the electronic circuit breaker did not send a report, the receiving software of the monitoring device could then recognize and report the electronic circuit breaker itself is offline and non-functional.

In another example, when the electronic circuit breaker is in the off, or tripped, position the electronics would continue to operate to periodically test or "ping" the load circuit coupled to the electronic circuit breaker to determine and report: a) the resistance of circuit (this could include recognizing a short circuit, or, for hard wired loads, recognizing a deviation from a normal operating state; and b) check other parameters of the load circuit with a low voltage/low current test signal. It should be understood that this test could be a continuous test, or a periodic test or may be automatically performed or manually checked.

For hard wired loads, (e.g., a condenser that is not unpluggable from the circuit), the circuit breaker could also include a "set" button to enable the circuit breaker to be turned to the on position, and, subject to the load operating in a normal state, the circuit breaker could then be turned to the off position and the "set" button activated to encode the detectable parameters for that particular load to be stored in the breakers storage (memory). The circuit breaker could also be commanded to perform this function by way of software communication in lieu of employing a 'set' button on the breaker. In this way, should the circuit breaker trip, the circuit breaker would be able to report to a remote monitoring device any discrepancy versus its saved normal off-state load parameters.

In the event that the breaker while in the OFF/TRIPPED position determines that a short circuit or a ground fault exists, as may be indicated by the circuit breaker measuring load circuit resistance and/or performing a voltage drop analysis, a technician working on the circuit could remotely monitor the circuit breaker data for indication when the fault condition has been cleared. Additionally, should the circuit breaker monitoring electronics indicate an unacceptable anomaly, the circuit breaker would be prevented from being able to be turned to the on state while the anomaly exists.

It is still further understood that the circuit breaker could be provided with additional capacity for turning off rather than waiting for the overcurrent protection circuit from activating. For example, the circuit breaker could be provided with the capability of receiving a communication signal from a connected load that functions to turn the circuit breaker off. This could be done even if no overload condition is present in the circuit. Rather, the load could self-monitor and, if the load determines that its current operating parameters fall outside of a range of determined safe operating parameters, the load could send a shut off signal to the circuit breaker causing the circuit breaker to cut off power to the load. This could be done, for example, before the load would suffer any major damage.

It is contemplated that the shut off signal from the load could be sent to the circuit breaker directly through the power cabling, which would not require any additional wiring to implement from the load to the circuit breaker. Alternatively, the shut off signal could be sent via an Ethernet connection through, for example, a breaker interfacing control system. Likewise, the circuit breaker could subsequently report the breaker status and the reason the electronics of the load instructed the circuit breaker to disconnect power to the load. This report could be transmitted via the network connection to a remote location. This would again enable maintenance of the load prior to suffering potential major damage or catastrophic failure.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration a circuit breaker comprising a line connection adapted to be coupled to a power source, a load connection adapted to be coupled to a load, and a first and a second contact moveable with respect to each other and corresponding to a closed state and an open state. The circuit breaker further comprises an overcurrent protection circuit coupled between the line connection and the load connection, where when a measured current exceeds a threshold, the overcurrent circuit determines that a fault condition is present and moves the contacts to the open state. The circuit breaker still further comprises a control circuit coupled to the load connection, the control circuit having a storage with a signal value saved thereon. The circuit breaker is provided such that when the contacts are in the open state, the control circuit is adapted to transmit a test signal to the load connection and to measure the transmitted signal, and the control circuit compares the measured signal to the signal value in storage and if the measured signal exceeds a threshold value, the control circuit maintains the contacts in the open state.

In another configuration a circuit breaker is provided comprising a line connection adapted to be coupled to a power source, a load connection adapted to be coupled to a load, and a first and a second contact moveable with respect to each other and corresponding to a closed state and an open state. The circuit breaker further comprises an overcurrent protection circuit coupled between the line connection and the load connection, where when a measured current exceeds a threshold, the overcurrent circuit determines that a fault condition is present and moves the contacts to the open state. The circuit breaker still further comprises a control circuit adapted to receive a trouble signal from the load, the trouble signal being independent from the current measurement. The circuit breaker is provided such that when the trouble signal is received by the control circuit, the control circuit moves the contacts to the open state.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
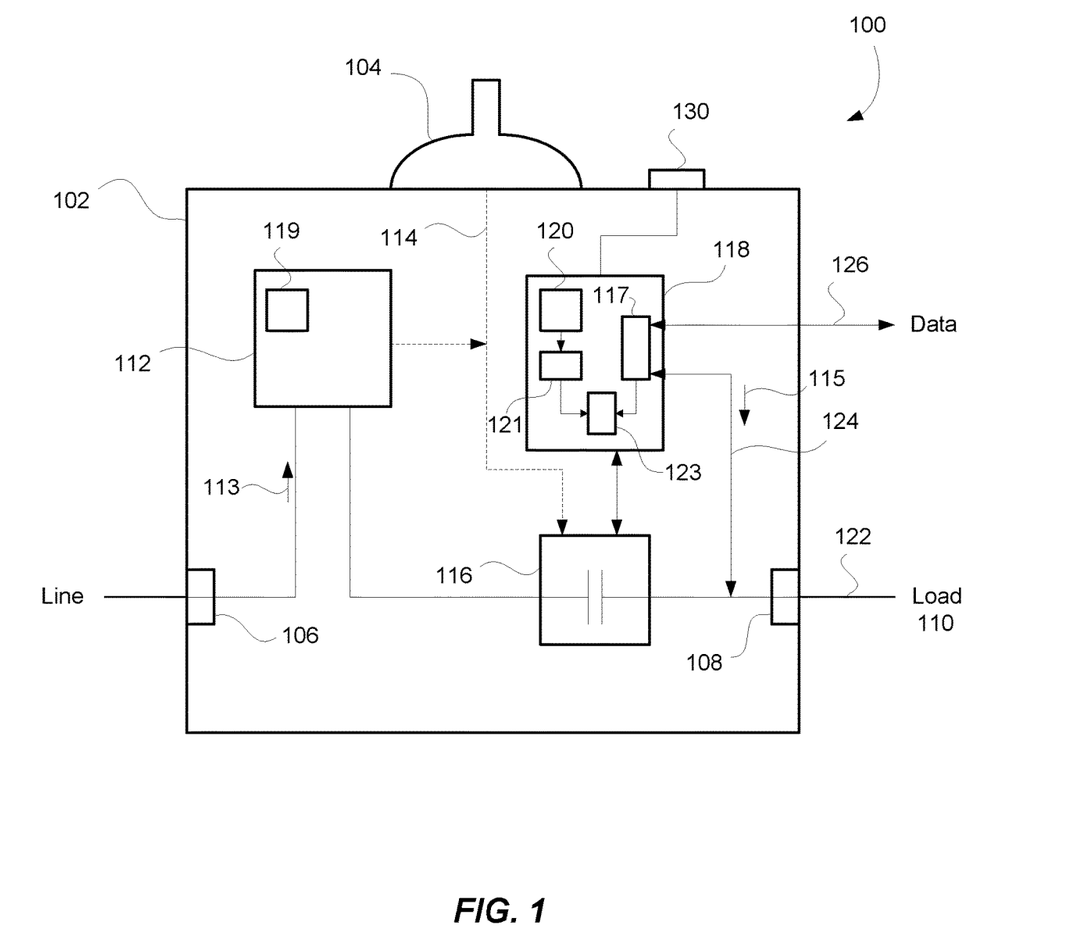
FIG. 1 is an illustration of a circuit breaker according to one aspect of the invention.

FIG. 1 depicts a circuit breaker 100 having a housing 102 with a handle 104. The circuit breaker could be any type of circuit breaker including, but not limited to having a line connection 106 that comprises a "stab" circuit breaker that includes two tines that connect to an electrical service bus bar in an electrical panel and a screw type connector comprising load connection 108 to be attached to a load 110 (FIG. 2); or line connection 106 could comprise a screw type connection for attaching to an electrical service bus bar in an electrical panel. There are numerous configurations that are possible and the above are just provided as two examples.

An overcurrent protection circuit 112 is provided that receives incoming power from line connection 106. Overcurrent protection circuit 112 is provided to measure the current 113 passing through the circuit breaker such that, if the measured current 113 exceeds an overcurrent threshold amount 119, the overcurrent protection circuit 112 actuates a linkage 114 that functions to open the contacts 116 setting them in the tripped position preventing the delivery of electricity to the load 110. As is generally known in the art, the contacts 116 generally comprise a moveable contact and a stationary contact, where the position of the handle will determine the positioning of the moveable contact with respect to the stationary contact. For example, in the on position, the linkage 114 will function to close the contacts. In the off position, the linkage 114 will function to fully open the contacts 116; and in the tripped position, the linkage 114 will function to open the contacts 116. To reset the circuit breaker 100 when in the tripped position, a user will typically move the handle 104 to the off position, and then to the on position.

Also illustrated in FIG. 1 is control circuit 118 that is provided with a storage 120. Control circuit 118 is provided with electronics for generating and measuring signal characteristics of the load circuit 122 and the load 110. For example, control circuit 118 is coupled to load circuit 122 via connection 124, which is used to inject a signal into load circuit 122, and may, in certain configurations, be used to receive a trouble signal from the load 110.

Also illustrated in FIG. 1 is data connection 126, which is connected to control circuit 118. Data connection 126 is provided for transmission and reception of data and control signals.

Figure 2:
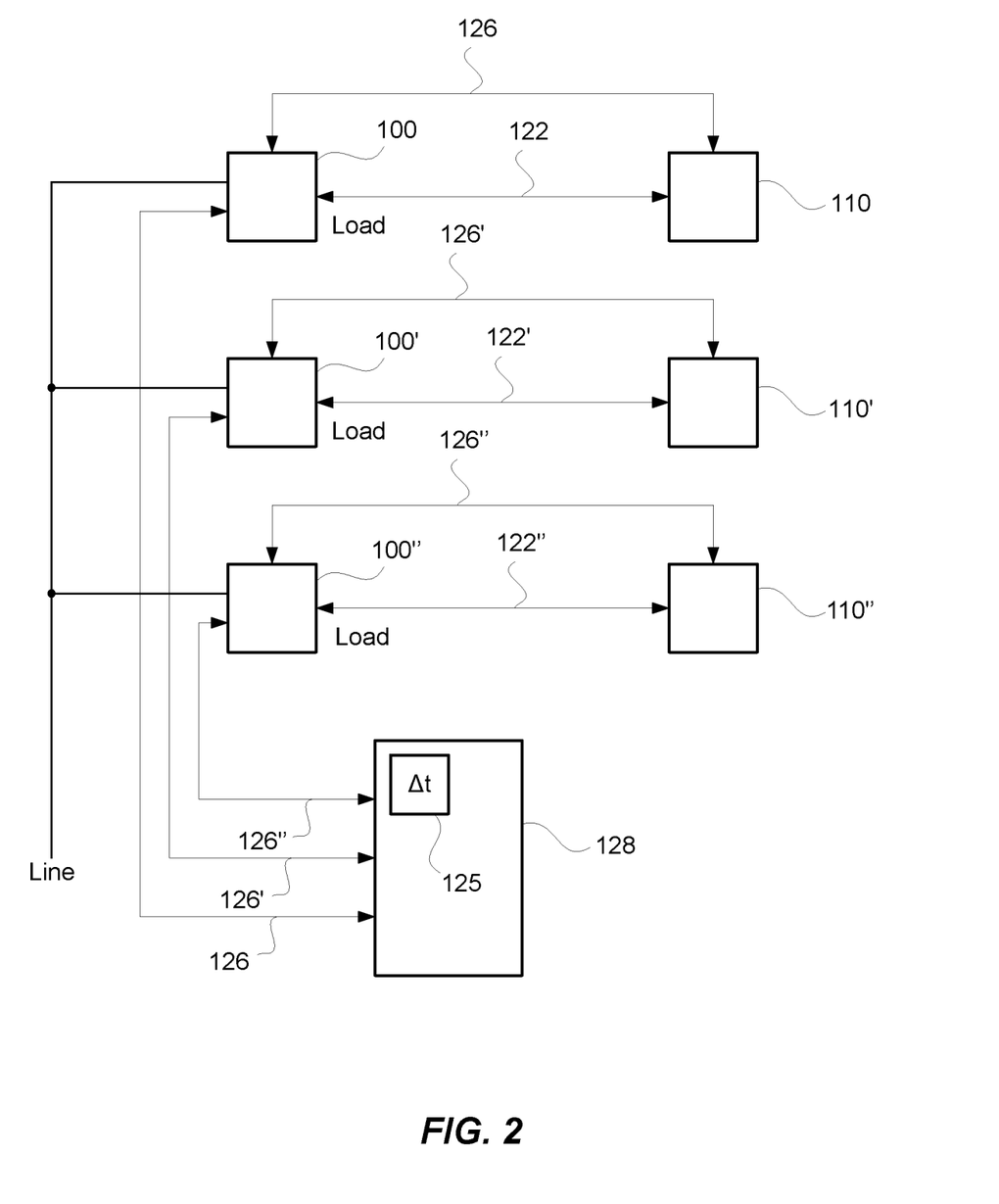
FIG. 2 is a block diagram of multiple circuit breakers according to FIG. 1

Referring to FIG. 2, a block diagram of circuit breaker 100, 100', 100" is provided showing various circuit breakers attached to a source of power (such as power provided on a bus bar of a panel board) and labeled "Line" in FIG. 2. The circuit breaker 100 is connected to load 110 via load circuit 122. Additionally, in one configuration the circuit breaker 100 may also be connected to load 110 via data connection 126. It is further contemplated that data connection 126 may configured as an Ethernet connection and connected in a daisy chain configuration, extending to a remote monitoring device 128.

Turning back to FIG. 1, a memory mechanism 130 is provided on the upper surface of the housing 102 of circuit breaker 100. In one configuration, the memory mechanism 130 may be provided as a button that may be depressed. Alternatively, the memory mechanism 130 does not have to be physically located on circuit breaker 100, but could comprise functional software that is actuated remotely by a computer. The function and operation of memory mechanism 130 will be discussed further in conjunction with FIGS. 2 and 3.

Figure 3:
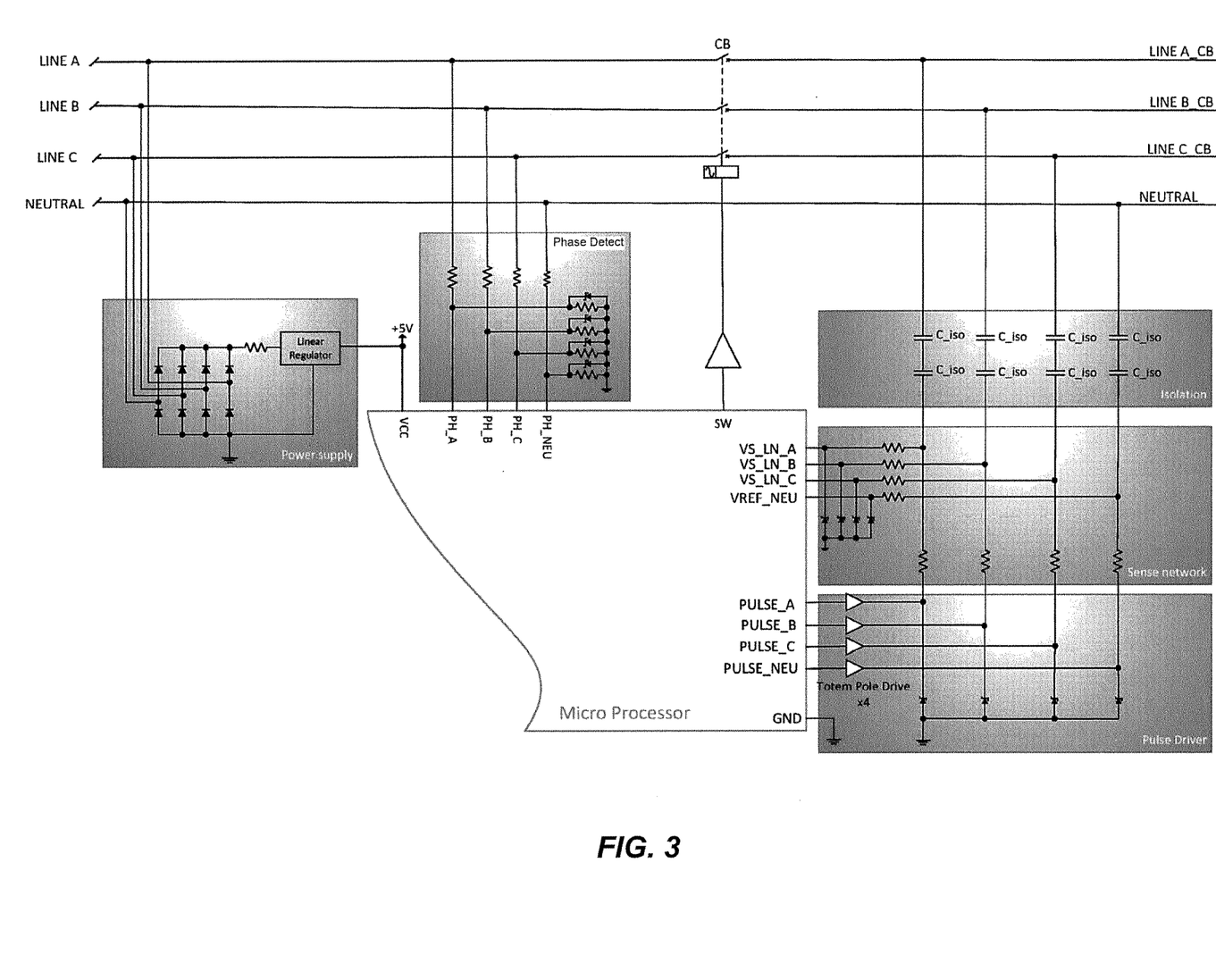
FIG. 3 is a schematic diagram of the circuit breaker according to FIG. 1.

Referring now to FIG. 3, a schematic diagram is illustrated. In operation, the circuit is enabled when the circuit breaker 100 is in the open position and disabled when circuit breaker is in the closed position. It should be noted that the circuit shown in FIG. 3 is partially maintained within control circuit 118.

The circuit shown in FIG. 3 is provided, in one configuration, to test for a short circuit condition between all lines (Line to Neutral; Line to Line). A test pulse is active near the AC zero crossing range reference to neutral or to each pull down lines.

During a Line to Line test, the circuit pulls one of the lines low through the totem pole driver; and sends the test pulse through another line. The comparator (LINE_DETECT & NEUT_REF) monitors the sense voltage to check for a short circuit. The information gathered and potentially saved in memory 120 includes: the program test pulse width, the number of the test pulses needed, and the test pulses string duration.

If a short is detected, the circuit will latch off (sw) the solenoid and send a fault alarm. It is contemplated that, in one configuration, the circuit can continuously monitor the line condition and can automatically unlatch the SW when it is determined that the short no longer exists.

Capacitors (C_iso) are positioned as AC isolation elements when circuit breaker closed to supply the power to the load. The double capacitor isolation option is double fault protection Theory of Operation:

When the circuit breaker is "off" or the contacts are in an open position (whether because of being tripped or turned to off) a capacitive coupled (C_iso) pulse from a voltage source (Microprocessor and Totem Pole Drives) with a series resistance (sense network) is applied across the load and the load voltage drop is detected (sense network resistors to microprocessor inputs). The capacitive coupling supplies isolation between the pulse source and load at low frequencies while providing a high frequency path for the leading edge of the test pulse. In operation, a short may be detected as a low voltage drop at the leading edge of the pulse. Pairs of lines may be tested in sequence to cover all possible short circuit paths. However, this short circuit detection system will be inactive when the breaker is on or the contacts are in the closed position. If a short is detected when the circuit breaker is in the OFF or TRIPPED position, the circuit breaker is blocked, or prevented from being turned ON, or closed and an alert or indication is provided to a user indicating the status.

The series resistance of the pulse source is set to be comparable to the expected maximum loads to that of the measureable voltage drop seen with nominal loads, while a short produces very little voltage drop. The detection of the short is made at the beginning or leading edge of the pulse. If, at this time, there is less than a set voltage drop across the load, a determination that a short exists is made.

If the load is inductive with a low DC resistance (e.g., a motor at start up) the inductance will present a high enough impedance to the pulse that the voltage drop will be near the value of the pulse voltage level at the start of the pulse even though the DC resistance is low.

Purely capacitive loads without significant series resistance will appear as short circuits. However, large capacitive loads will also have enough series resistance and/or inductance to prevent a false short detection.

The UL standards most likely will not support the capacitive coupling to the de-energized load if the smart system is powered directly from the line, so an isolated AC/DC power supply (low power) will be needed to power the system. Alternatively, the series combination of two safety rated capacitors as shown for C_iso may provide the required performance to achieve compliance.

The zero crossing (phase detect) network is incorporated as needed to support the timing of the short detection pulses.

While FIG. 3 illustrates a three phase circuit, it is contemplated that a single phase circuit could effectively be used in a similar manner as described above.

Turning back to FIG. 2, it is contemplated that remote monitoring device 128 can send a status signal to circuit breaker 100 to ensure that the device is active and functional. If, after a threshold period of time 125 or a threshold number of tries, remote monitoring device 128 does not receive a confirmation from circuit breaker 100, then remote monitoring device 128 generates and alarm related to said circuit breaker 100 indicating that the device is inactive or offline.

In one configuration, control circuit 118 is configured to generate a test signal 115 to be transmitted to load 110 and to measure the electrical characteristics of the test signal 115. The control circuit then generates measured test signal data 117, which is then saved in storage 120 and/or transmitted to remote monitoring device 128.

For circuit breakers 100 that hardwired loads (e.g., loads that are not unpluggable and therefore fixed), memory mechanism 130 may be used to take a measurement of the load 110 that can be saved in storage 120. Functionally, the circuit breaker 100 is set to the off position and then the memory mechanism 130 may be activated (either as a button on the housing or as software from a remote location). When activated, a load parameter signal is transmitted to load 110 and control circuit 118 measures electrical signal parameters of the transmitted load parameter signal. This will create a baseline of "normal" operating parameters that will be saved in storage 120. If the circuit breaker is set to off or is tripped, the control circuit can then send a test pulse to load 110, which is measured and compared against the saved data 121 to determine if a fault is present. Deviation from the saved data can provide further information as to what or the type of fault that may exist. This deviation information or discrepancy data can be transmitted to a remote location so that a technician can have gathered data to examine even before arriving on site.

In one configuration, the circuit breaker 100 can generate and alarm condition based on the measured test signal deviation. It is contemplated that the circuit breaker 100 could prevent resetting of the contacts while the alarm condition exists. Likewise, once it is determined that the alarm condition no longer exists, the circuit breaker may allow the contacts to be reset. This alarm condition could further be transmitted to remote monitoring device 128.

It is further contemplated that the test signal can be transmitted to the load 110 as previously described herein, however, if the measured signal does not exceed a discrepancy threshold value 123 (i.e., no short exists, or no significant deviation from a previously measured value exists), the control circuit 118 may generate a notification that the load circuit 122 and/or load 110 is "normal" and functional. The notification may further be transmitted to remote monitoring device 128.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A circuit breaker comprising:
   a line connection;
   a load connection;
   a first and a second contact moveable with respect to each other and corresponding to a closed state and an open state;
   an overcurrent protection circuit coupled between said line connection and said load connection, where when a measured current passing through the circuit breaker exceeds an overcurrent threshold, said overcurrent circuit determines that a fault condition is present and moves the contacts from the closed state to the open state;
   a memory mechanism to enable a memory save function;
   a control circuit coupled to said load connection, wherein said load connection receives a load parameter signal from the control circuit while the contacts are in an open state and a load is connected to said load connection, said control circuit having a storage with a signal value saved thereon;
   wherein the signal value is determined by setting the contacts to the open state, activating the memory mechanism when the load is connected to said load connection to transmit the load parameter signal to the load connection and measure baseline electrical signal parameters of the transmitted load parameter signal, and saving the measured baseline electrical signal parameters reflecting normal operating parameters of the load as the signal value in said storage;
   wherein when the overcurrent protection circuit has moved the contacts to the open state, said control circuit transmits a test signal to said load connection while the load is connected thereto and measures the test signal; and
   wherein said control circuit compares the measured test signal to the saved signal value that reflects the normal operating parameters of the connected load and, if the measured test signal exceeds a threshold value of deviation from the signal value, said control circuit maintains the contacts in the open state.

2. The circuit breaker according to claim 1 wherein if the measured test signal exceeds the discrepancy threshold value, said control circuit further generates an alarm that is transmitted via a network connection.

3. The circuit breaker according to claim 2 further comprising a remote monitoring device coupled to said circuit breaker via the network connection, wherein said control circuit transmits a status signal to said remote monitoring device and if a status signal is not sent to said remote monitoring device after a threshold period of time, said remote monitoring device generates an alarm related to said circuit breaker.

4. The circuit breaker according to claim 2 further comprising a remote monitoring device coupled to said circuit breaker via the network connection, wherein said control circuit measures the electrical characteristics of the test signal to generate measured test signal data and transmits the measured test signal data to said remote monitoring device.

5. The circuit breaker according to claim 1 wherein said circuit breaker generates an alarm condition based on the comparison of the measured test signal to the signal value in said storage.

6. The circuit breaker according to claim 5 wherein said circuit breaker prevents resetting of said contacts for as long as the alarm condition exists.

7. The circuit breaker according to claim 5 wherein said circuit breaker allows said contacts to be reset when it is determined that the alarm condition no longer exists.

8. The circuit breaker according to claim 5 wherein the alarm condition is transmitted to a remote monitoring device.

9. The circuit breaker according to claim 1 wherein if the measured test signal does not exceed the discrepancy threshold value, said control circuit generates a notification that is transmitted via a network connection.

10. The circuit breaker according to claim 1 further comprising:
    a housing enclosing said first and second contacts, said overcurrent protection circuit and said control circuit; and
    a handle coupled to said housing, said handle moveable between an on position, an off position and a tripped position.

11. The circuit breaker according to claim 1 wherein said control circuit is positioned on a Printed Circuit Board (PCB).

12. The circuit breaker according to claim 1 wherein said test signal is transmitted periodically.

13. A circuit breaker comprising:
    a line connection;
    a load connection coupled to a self-monitoring load, the load monitoring itself and generating a trouble signal if the load determines that current operating parameters of the load fall outside a range of safe operating parameters;
a first and a second contact moveable with respect to each other and corresponding to a closed state and an open state;
an overcurrent protection circuit coupled between said line connection and said load connection, where when a measured current passing through the circuit breaker exceeds an overcurrent threshold, said overcurrent circuit determines that a fault condition is present and moves the contacts to the open state; and
a control circuit that receives the trouble signal from the load when the load determines that current operating parameters fall outside the range of safe operating parameters, said trouble signal being independent from the measured current;
wherein when the trouble signal is received by said control circuit, said control circuit moves said contacts to the open state.

14. The circuit breaker according to claim 13 wherein the trouble signal is transmitted from said load to said circuit breaker via power cabling connecting said load to said load connection.

15. The circuit breaker according to claim 13 wherein the trouble signal is transmitted from said load to said circuit breaker via an Ethernet connection extending between said load and said circuit breaker.

16. The circuit breaker according to claim 13 further comprising:
a remote monitoring device coupled to said circuit breaker via a network connection;
wherein an alarm is generated when the trouble signal is received by said circuit breaker and the alarm is transmitted to said remote monitoring device.

17. The circuit breaker according to claim 13 wherein said control circuit is coupled to said load connection, said control circuit having a storage with a signal value saved thereon;
wherein when the contacts are in the open state, said control circuit transmits a test signal to said load connection and measures the test signal;
wherein said control circuit compares the measured test signal to the signal value in said storage and if the measured test signal exceeds a discrepancy threshold value, said control circuit maintains the contacts in the open state.

18. The circuit breaker according to claim 17 wherein if the measured test signal exceeds the discrepancy threshold value, said control circuit further generates an alarm that is transmitted via a network connection.

19. The circuit breaker according to claim 18 further comprising a remote monitoring device coupled to said circuit breaker via the network connection, wherein said control circuit transmits a status signal to said remote monitoring device and if a status signal is not sent to said remote monitoring device after a threshold period of time, said remote monitoring device generates an alarm related to said circuit breaker.

20. The circuit breaker according to claim 18 further comprising a remote monitoring device coupled to said circuit breaker via the network connection, wherein said control circuit measures the electrical characteristics of the test signal to generate measured test signal data and transmits the measured test signal data to said remote monitoring device.

21. The circuit breaker according to claim 18 further comprising:
a remote monitoring device coupled to said circuit breaker via the network connection; and
a memory mechanism to enable a memory save function; and
wherein the signal value is determined by setting the contacts to the open state, activating the memory mechanism to transmit a load parameter signal to the load and to measure baseline electrical signal parameters of the transmitted load parameter signal, and saving the measured baseline electrical signal parameters as the signal value in said storage.

22. The circuit breaker according to claim 21 wherein said circuit breaker generates an alarm condition based on the comparison of the measured test signal to the signal value in said storage.

23. The circuit breaker according to claim 22 wherein said circuit breaker prevents resetting of said contacts for as long as the alarm condition exists.

24. The circuit breaker according to claim 22 wherein said circuit breaker allows said contacts to be reset when it is determined that the alarm condition no longer exists.

25. The circuit breaker according to claim 22 wherein the alarm condition is transmitted to said remote monitoring device.

26. The circuit breaker according to claim 18 wherein if the measured test signal does not exceed the discrepancy threshold value, said control circuit generates a notification that is transmitted via a network connection.

27. The circuit breaker according to claim 18 further comprising:
a housing enclosing said first and second contacts, said overcurrent protection circuit and said control circuit; and
a handle coupled to said housing, said handle moveable between an on position, an off position and a tripped position.

28. The circuit breaker according to claim 18 wherein said control circuit is positioned on a Printed Circuit Board (PCB).

29. The circuit breaker according to claim 18 wherein said test signal is transmitted periodically.

* * * * *